United States Patent
Vasilyev et al.

(10) Patent No.: US 10,637,715 B1
(45) Date of Patent: Apr. 28, 2020

(54) FAULT ISOLATION IN OVER-THE-TOP CONTENT (OTT) BROADBAND NETWORKS

(71) Applicant: Conviva Inc., Foster City, CA (US)

(72) Inventors: Oleg Vasilyev, Palo Alto, CA (US); Wensi Fu, Sunnyvale, CA (US); Henry Milner, Berkeley, CA (US); Sandeep Pombra, Los Altos Hills, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 15/960,913

(22) Filed: Apr. 24, 2018

Related U.S. Application Data

(60) Provisional application No. 62/500,341, filed on May 2, 2017.

(51) Int. Cl.
*H04L 12/28* (2006.01)
*H04L 12/24* (2006.01)

(52) U.S. Cl.
CPC ........ *H04L 41/065* (2013.01); *H04L 41/0816* (2013.01); *H04L 41/12* (2013.01); *H04L 41/145* (2013.01); *H04L 41/147* (2013.01); *H04L 41/5035* (2013.01)

(58) Field of Classification Search
None
See application file for complete search history.

(56) References Cited

U.S. PATENT DOCUMENTS

| | | | |
|---|---|---|---|
| 9,451,306 B2 | 9/2016 | Sarukkai | |
| 2003/0187986 A1* | 10/2003 | Sundqvist | H04L 41/12 709/225 |
| 2004/0078470 A1 | 4/2004 | Baumeister | |
| 2005/0083844 A1* | 4/2005 | Zhu | H04L 29/06027 370/230.1 |
| 2006/0282225 A1 | 12/2006 | Sunshine | |

(Continued)

OTHER PUBLICATIONS

Ahmed et al., Suffering from Buffering? Detecting QoE Impairments in Live Video Streams, 2017 IEEE 25th International Conference on Network Protocols (ICNP), 2017.

*Primary Examiner* — Elisabeth Benoit Magloire
(74) *Attorney, Agent, or Firm* — Van Pelt, Yi & James LLP

(57) ABSTRACT

Fault isolation in over-the-top content (OTT) broadband networks is disclosed. Network topology information associated with a network service provider is received. Session information associated with one or more streaming sessions is received. A predictive model is generated for predicting session quality at least in part by using at least some of the network topology and session summary information as features. The predictive model is used to determine a first prediction of session quality using a first set of feature values. A second set of feature values is generated at least in part by replacing a first feature value in the first set of feature values with a replacement value. The predictive model is used to determine a replacement prediction of session quality using the second set of feature values including the replacement value with which the first feature value was replaced. Based at least in part on the first prediction and the replacement prediction, an impact of the first feature value on session quality is determined. A fault in a content delivery ecosystem is isolated based at least in part on the determined impact of the first feature value on session quality.

20 Claims, 6 Drawing Sheets

(56) References Cited

U.S. PATENT DOCUMENTS

| | | | |
|---|---|---|---|
| 2007/0002897 A1* | 1/2007 | Goshen | H04L 29/06027 370/468 |
| 2007/0263984 A1 | 11/2007 | Sterner | |
| 2007/0288518 A1 | 12/2007 | Crigler | |
| 2008/0225706 A1* | 9/2008 | Lange | H04L 41/0896 370/230 |
| 2009/0054074 A1* | 2/2009 | Aaron | H04W 24/08 455/452.2 |
| 2012/0311126 A1 | 12/2012 | Jadallah | |
| 2013/0014137 A1 | 1/2013 | Bhatia | |
| 2013/0227648 A1* | 8/2013 | Ricci | G06F 3/0484 726/3 |
| 2014/0160941 A1 | 6/2014 | Hui | |
| 2014/0337871 A1 | 11/2014 | Garcia de Blas | |
| 2014/0351840 A1 | 11/2014 | Andrade | |
| 2015/0195126 A1 | 7/2015 | Vasseur | |
| 2016/0112894 A1 | 4/2016 | Lau | |
| 2016/0156520 A1 | 6/2016 | Scully | |
| 2016/0164761 A1 | 6/2016 | Sathyanarayana | |
| 2016/0232538 A1 | 8/2016 | Papakostas | |
| 2016/0241927 A1 | 8/2016 | Kilar | |
| 2017/0126476 A1 | 5/2017 | Curtin | |
| 2017/0171252 A1 | 6/2017 | Xue | |
| 2017/0223036 A1 | 8/2017 | Muddu | |
| 2017/0244777 A1 | 8/2017 | Ouyang | |
| 2017/0250882 A1 | 8/2017 | Kellicker | |
| 2018/0278487 A1* | 9/2018 | Mermoud | H04L 29/06 |
| 2018/0288461 A1 | 10/2018 | Funk | |
| 2019/0045235 A1 | 2/2019 | Giladi | |

* cited by examiner

FAULT ISOLATION IN OVER-THE-TOP CONTENT (OTT) BROADBAND NETWORKS

CROSS REFERENCE TO OTHER APPLICATIONS

This application claims priority to U.S. Provisional Patent Application No. 62/500,341 entitled FAULT ISOLATION IN OVER-THE-TOP CONTENT (OTT) BROADBAND NETWORKS filed May 2, 2017 which is incorporated herein by reference for all purposes.

BACKGROUND OF THE INVENTION

Health monitoring and automated failure localization and diagnosis have become increasingly critical to service providers of large distribution networks (e.g., Digital Subscriber Line (DSL), digital cable, fiber-to-the-home, etc.), especially due to the increases in scale and complexity of video streaming over-the-top (OTT) services. Unfortunately, existing failure diagnosis solutions that focus on traditional techniques such as loop health, modulation parameters, forward error correction (FEC), utilization, etc. are limited in the insights that they can provide.

BRIEF DESCRIPTION OF THE DRAWINGS

Various embodiments of the invention are disclosed in the following detailed description and the accompanying drawings.

DETAILED DESCRIPTION

Figure 1:
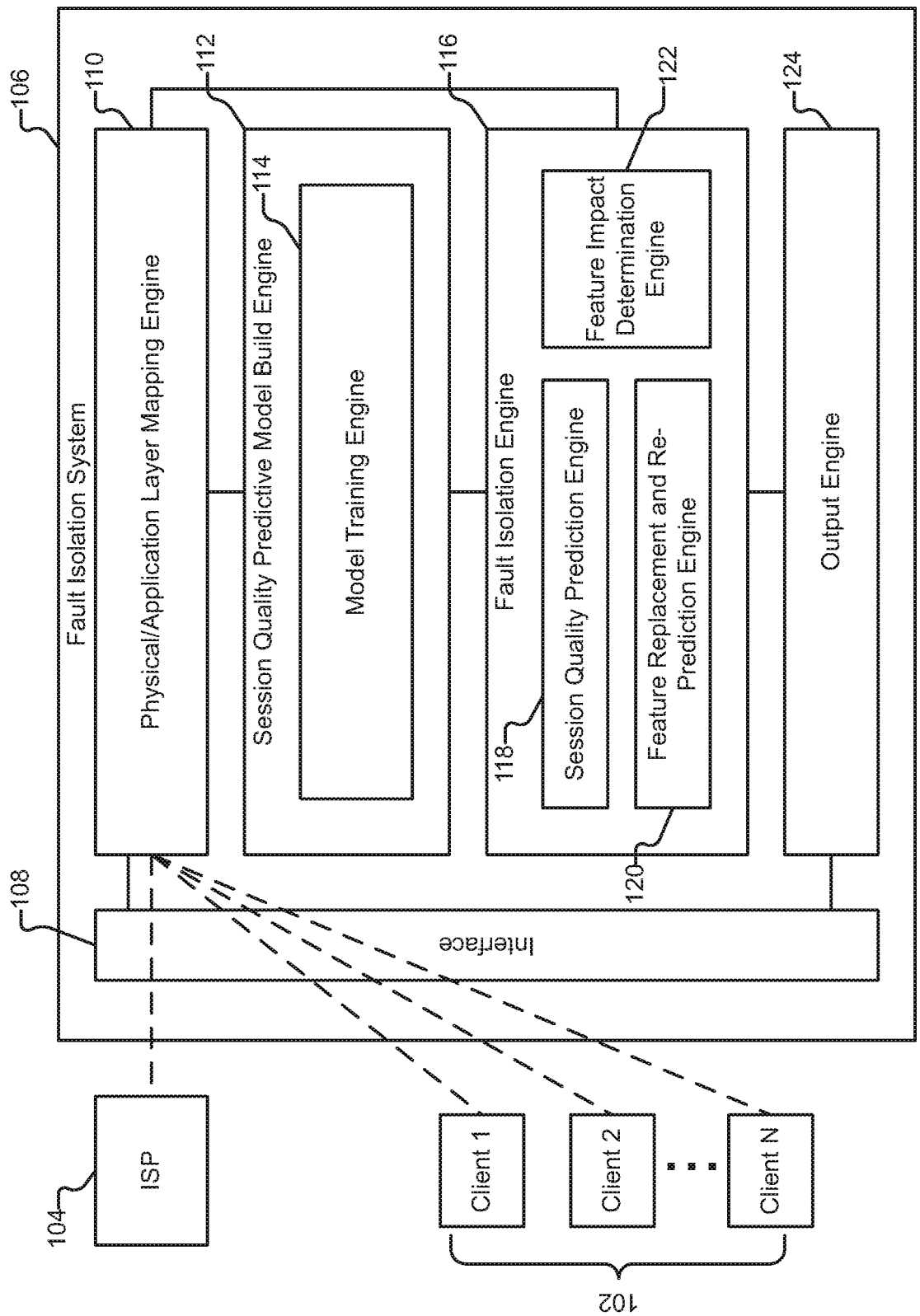
FIG. 1 illustrates an embodiment of an environment in which fault isolation in over-the-top content (OTT) broadband networks is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Originally, when broadband networks were introduced, the networks were focused on users downloading files or obtaining data and FTPing data. However, there has been a large growth in video streaming over broadband networks, where video streaming is the primary use of broadband networks for many users.

Internet Service Providers (ISPs) are increasingly interested in determining how well their networks are performing, as well as the satisfaction of their customers and end users.

Existing failure diagnosis solutions for large distribution networks typically focus on traditional techniques of characterizing the network, such as loop health, modulation parameters, forward error correction (FEC), and utilization. However, these traditional techniques do not take into consideration video streaming or the user video quality of experience (QoE). For example, the existing techniques characterize the network based on traffic such as UDP (user datagram protocol) traffic which has error correction and error concealment built in. OTT video streaming, on the other hand, is TCP (transmission control protocol)-focused, with a large amount of retransmission. Thus, existing techniques used to measure a network and identify issues within various parts of the video streaming ecosystem are not sufficient because they do not directly relate to the end user experience or the quality of experience that the end user or consumer is having.

Another challenge with existing techniques for fault isolation is that the existing techniques are primarily spot-based, where checking is performed by spot-based tests, modem error correction tests, etc. One example of spot-based checks is drive testing, which includes driving and measuring the signal of towers in a mobile network, or randomly testing fiber nodes. Such spot checking is not continuous, and also has various blind spots (e.g., spot checking would not take into account passengers in cars streaming). Further, existing techniques for fault isolation performed by broadband networks could not be correlated with the user experience in video streaming, which may include how long the video takes to start, how much buffering is there in the video, did the video finish playing, did the video session error out, what was the quality of the video, etc.

Thus, while broadband service providers may be able to respond to major events such as outages or physical components going down, or perform spot-based checks, it is challenging for broadband service providers to measure the quality of their network in a continuous, autonomous way.

Described herein are techniques for performing network fault isolation and localization using OTT video streams whose quality is observed and collected. For example, metrics measuring the quality of experience for consumer's video sessions are used to determine how different components of the broadband network affect these metrics. The fault isolation and localization techniques described herein include an advanced machine learning-based system that can infer fault groups (FGs) or faulty network components based on historical video quality of experience metrics. The inferred fault groups may be used to localize failures, diagnose root causes of problems, and detect impairments in the end-to-end video streaming ecosystem. The machine learning-based system described herein implements supervised learning algorithms to infer fault groups using data collected from real networks serving users via millions of potential fault groups including publishers, content, devices, geolocations, CDNs, service groups, fiber nodes, DSLAMs (digital subscriber line access multiplexers), and IP addresses. The machine learning techniques evaluate the different hierarchies and topologies within the broadband network. For example, the evaluation of a cable network would start from the CMTS (Cable Modem Termination System), to service groups, to fiber nodes, to IP addresses, to in-home devices. Other types of broadband networks with other types of topologies (such as DSL which includes switches, edge routers, DSLAMs, and IP addresses) may also be evaluated using the techniques described herein.

As will be described in further detail below, the machine learning techniques treat each of the elements of the network topology as a feature. A multitude of other confounding features related to how content is streamed (e.g., device type, underlying CDN, geo-location, content or asset type, publisher, service provider for a session, etc.) are also combined with the network elements to create an advanced model that is used to predict QoE metrics as a function of all of the aforementioned features. As will be described in further detail below, by constructing a model usable to predict QoE metrics as a function of various network and OTT features, the model can be used to identify which of the features could potentially be causing issues within the QoE metrics.

A counterfactual (also "contrafactual") predictive approach is used for isolating faults, further details of which will be described below. In one embodiment of the counterfactual approach:

A predictive model for the quality of a session is built using a set of features. For example, the predictive model that is built has the form:

$y = f(x)$

The model is trained on observed session data that is joined with network topology information. For example, the session data is represented in the form of $\{(x_1, y_1) \ldots (x_N, y_N)\}$ The predictive model is used to generate or predict the quality of each session based on the observed features of the sessions. For example, this initial prediction based on observed session values is represented in the following form:

$\hat{y} = \hat{f}(x : x_i^j = R)$

A specific value of a feature is replaced by a "good" value for the feature, and a re-prediction of a session's quality (but now including the replaced "good" value) is performed using the predictive model. The "good" value is selected in imitation of how the feature value (e.g., fiber node) would appear if it were a good node. The replacement prediction may be represented in the form:

$\widehat{y_G} = \hat{f}(x : x_i^j = G)$

The difference between the good re-prediction (based on the replaced feature value) and the prediction based on actual observed feature values, aggregated over all sessions with that feature value that was replaced, is determined. This difference is a score of the feature value that was replaced. The score reflects an effect or impact that the feature value or item had on the quality of sessions. The score for the feature may be represented in the following form:

$$\sum_{x_i^j = R} (\hat{y} - \widehat{y_G}) / N_R$$

The replacement and prediction is done separately for each feature or category, where the items with the worst scores are provided as output. Various other types of output may be provided based on the scoring.

Further details regarding the counterfactual approach will be described below.

While examples involving video streaming are described herein for illustrative purposes, the techniques described herein may be variously adapted to accommodate any type of content.

FIG. 1 illustrates an embodiment of an environment in which fault isolation in over-the-top content (OTT) broadband networks is performed.

In the example shown, clients 102 are used to access content, such as multimedia or audiovisual content (e.g., movies, songs, television shows, sporting events, games, images, etc.) that is owned by content owners. The content is stored (or captured) at origin servers, and distributed via content sources such as content distribution networks (CDNs). A content owner is also referred to herein as a "content publisher," as the content owners publish their content using content sources such as CDNs.

Examples of client devices include personal computers, laptops, cellular phones/personal digital assistants, and other types of information appliances or devices such as set-top boxes, games consoles, broadband routers, file servers, video servers, and digital video recorders, as applicable. Client devices may be used by subscribers to various Internet service providers (ISPs). In the example shown, client devices 102 are used by subscribers to ISP 104.

When content is distributed to client devices 102 by content publishers via CDNs, the content may traverse through potentially multiple backbone ISPs before connecting to local ISP 104, which provides, via its infrastructure, the content to client devices 102 used by their respective subscribers. Content from different publishers may travel through various distribution paths that include the same or different CDNs and ISPs.

In the example shown, client devices 102 include content player applications used to play back content. In some embodiments, the clients also have installed software sensors or monitoring engines (either as part of, or separate from, the content player application) used to instrument (e.g., take measurements of) content playback at the client end-point. The software sensors are configured to collect video session data for OTT networks and measurement data associated with content playback sessions. As used herein, a session refers to an entity representing an instance of a user's playback interactions with a content asset. The session may begin with a user's request for a particular content, and end when the user ceases playing the content (e.g., the user stops watching a requested video).

In some embodiments, the software sensors installed on the client devices are configured to measure and collect data continuously throughout the duration of a streaming playback session from end-points (such as client devices 102). In some embodiments, the software sensors are libraries or software development kits (SDKs) that have been deployed at client devices in the OTT ecosystem. The sensors collect real time information on how QoE metrics are behaving. For example, the software sensors are also configured to collect application performance and QoE (Quality of Experience) data at the end user session level. Examples of QoE metrics include buffering, bitrate, startup time, as well as event-based information such as failures/errors. The failures/errors can include video start failures (VSF), bitrate drops, rebuffering, etc. Metrics based on the events may also be computed. For example, a rebuffering ratio may be computed (the percentage of the time a user spends in buffering, after the video starts). Another example of a session metric that can be captured is the playing time of the session.

The session summary further includes the metadata aligned with the session metrics, such as the content provider of the session, the type of device used by the user of the session, the geo-location of the session, the CDN from which the session obtained video content, IP address of the client device on which the session was initiated, etc. The collected video session data is also referred to herein as "application layer data," as it is data associated with content player applications. In some embodiments, the session summary or viewer experience data is associated with the IP addresses or other common identifiers of the end users of the client devices.

The collected video session data is provided to fault isolation system 106 (e.g., over a network such as the Internet) via interface 108. In some embodiments, the client devices are configured to transmit messages (also referred to herein as "heartbeat messages" or "simple heartbeats") to system 106 throughout the duration of the session, where heartbeat messages include the measurements taken by the software sensors/monitoring modules. In some embodiments, each session is associated with a session identifier. Each session (and heartbeats) can also be associated with the IP address of the client end-point. Each heartbeat can also be associated with a timestamp of when the measurement data was collected. In some embodiments, the heartbeat messages include a unique identifier assigned to the end-point (e.g., assigned at the time that a content player application was installed on the device). System 106 can then summarize the ingested data received from the client to create a summary of the session (e.g., aggregate metrics collected at various points throughout the session, for example, by determining average values of metrics, counts for events, etc.). As another example, the client can be configured to summarize the data for a session and send the session summary to system 106.

In some embodiments, system 106 is configured to use the collected video session data to compute the above mentioned video Quality of Experience (QoE) metrics such as rebuffering ratio, average bitrate, video join time, video start failures, video playback failures, etc. In some embodiments, system 106 performs the alignment described above of associating (e.g., with tags) each session experience summary with rich metadata, such as the device type, content type, geolocation, CDN, publisher, Internet Protocol (IP) addresses, etc., which can also be obtained from end-points as well as via backend data ingestion by system 106. Such tagging may also be performed by the client devices and included in session summaries provided to system 106 via heartbeats, as described above.

System 106 is also configured to receive, via interface 108, physical layer information or data describing network topologies of various types of broadband networks such as Internet Service Provider (ISP) 104. In this example, suppose that ISP 104 provides cable broadband network services, where ISP 104 is a customer of the fault isolation services provided by system 106. The physical layer data received from the cable ISP is a hierarchy of the network topology of ISP 104, including IP addresses, fiber nodes, service groups, and geo-locations (CRAN) areas. The physical layer information may be received on a time-driven basis (e.g., weekly).

In some embodiments, a mapping of IP addresses or other common identifiers to network topology components is received. For example, ISP 104 provides system 106 with a mapping of IP addresses (which the ISP assigned to end-points (e.g., homes)) to components (or paths including multiple components) in the network topology. Two examples of mappings are the following:

(1) ip_address or ip_address_range (CIDR) (v4 or v6)→service group (naming following the structure above, e.g., <svc_group_name/number>.<CMTS-name>.city.state.<man_name>)

and (2) ip_address (v4 or v6) or ip_address_range→fiber node (naming following the structure above, e.g., <fiber_node_name>.<svc_group_name>.<CMTS-name>.<hub-name>.<man_name>)

In some embodiments, the ISP provides to platform 106 a mapping that specifies, for each end-point IP address (or range of IP addresses), the path (e.g., made up of a particular combination of network components in the topology) through the ISP's network topology by which content is distributed to the end-point. For example, the mapping can specify the names of the particular components in the network topology to which an IP address belongs.

The topology of the network and the mapping of network topology to IP addresses can be represented in a variety of ways, such as one file, or a set of files, that list each layer of the mapping.

In some embodiments, ISP 104 also provides to system 106 low level information about the components in its network topology. For example, the ISP can provide utilization, capacity information (e.g., percentage utilization), or any other component health monitoring information associated with its network components, as appropriate. The low level component measurement data can also be associated with timestamps (e.g., to determine the utilization of a component at a particular point in time). As will be described in further detail below, such low level component measurement data can be used to validate the accuracy of the predictive fault isolation techniques described herein.

In this example, physical/application layer mapping engine 110 is configured to join the received physical and application layer information. For example, using IP address as a key, the application layer session information is further joined with network topology information (physical layer information) provided by the ISP. By performing the mapping, for each session, the type of network topology elements used to deliver the content for the session is established. In the cable broadband network example, for every session, which includes the QoE session metrics, the fiber node, service group, CMTS, etc. corresponding to each session may be established. This results in an enriched session summary that includes not only session QoE metrics such as rebuffering ratio, but also the underlying features of the session. This provides a rich set of features for each session.

For example, a given video session obtained from a client end point includes the QoE metrics for the session and the IP address of the client (or the home that the client device is used at). The mapping of IP addresses to network topology can be used to determine that the given video session belongs to an IP address that belonged to a particular service group, that falls under a particular CMTS, which belongs to a particular hub, MAN, etc. Thus, the path (e.g., set of network components) inside the network via which content viewed in the session traversed can be determined. Thus, system 106 can correlate a particular session experience with a particular set of network components used to deliver the content viewed during that session.

Using the joined physical/application layer information, session quality predictive model build engine 112 is configured to generate a predictive model for predicting the quality of video sessions given various features such as a video session's service group, publisher, etc. Various considerations may be taken into account when selecting the "quality" measure as a label for training the model. For example, the quality of a session may be determined as a measure affecting viewer engagement. The quality of a session may also be determined as a measure of quality of the network for video delivery. For example, a video session may be measured by an individual QoE Metric, or the quality may be a measure that is a function of all or a subset of the QoE Metrics.

Machine learning for prediction includes estimating a prediction function that predicts a label as of a set of feature vectors. An example of the relationship between the label to predicted, the prediction function, and an input feature vector is shown below:

$$y = f(x)$$

where y corresponds to the label, $f$ corresponds to the prediction function, and x corresponds to the input feature vector. In this example, suppose that the label being predicted is the QoE metric, rebuffering (the percentage of the time a user spends in buffering, after the video starts). "$f$" is the predictive model or (nonlinear) function being built. x is an input feature vector that includes the categorical features corresponding to network topology/session metadata that is received from ISP 104 and client devices 102.

The machine learning for prediction includes two parts: training and testing.

As part of the training, given a training set of labeled examples $\{(x_1, y_1), \ldots, (x_n, y_n)\}$, the prediction function $\hat{f}$ is estimated by minimizing the prediction error on the training set. Further details regarding training will be described below.

As will be described in further detail below, during testing, $f$ may be applied to a never before seen test example x (e.g., a set of features used as input where the set includes values that were not actually observed or collected from client devices). The predicted value $\hat{y} = \hat{f}(x)$ may then be outputted, as will be described in further detail below.

When building the predictive model, relevant factors that influence video session quality are included in the model as features. The features are selected or created in a way that clearly separates the influence of different items that should be discernable when performing the fault isolation (e.g., IP addresses, fiber nodes, assets, etc.), which will be described in further detail below. The features are also created in a manner such that feature values may be replaced when using an already trained model. Replacement of feature values to perform fault isolation will be described in further detail below. Examples of factors include publishers, content, devices, geolocations, CDNs, service groups, fiber nodes, DSLAMs, and IP addresses. The features included in the model are created using individual factors or combinations of factors.

The features may include continuous features (e.g., which may be real valued). The features may also include categorical features that have discrete values/labels, such as fiber node names, IP addresses, device types, etc. Further details regarding features and their selection are described below.

An example listing of categorical features includes:
I, N, S, P, A, C, D, AC, AD, PCD, ACD
where
I=IP address
N=Fiber node
S=Service group
P=publisher
A=Publisher and asset
C=CDN and Geo (CRAN)
D=Device Examples of continuous/discrete features include content type, content length, time, time of day, day of week, etc.

A large number of features may be included in generating the model. As described above, examples of features include the publisher (e.g., the content provider), the asset or content itself (identifiable by its name or label or identifier), the device type (e.g., Android, iPhone, etc.), geolocation (e.g., zip code or city that the device is in), the ASN value, the CDN that the session is being served from, as well as the broadband network component metadata joined to the video session metadata (based on IP address), including the example of a cable broadband network, fiber node, CMTS, connection type (e.g., Wi-Fi, direct ethernet, etc.), time of day, etc.

Not only may there be a large number of features, but some of the features may also have a large number of values. For example, a broadband network may have hundreds of thousands of fiber nodes in the United States, and also hundreds of thousands of service groups. There may be millions of IP addresses. The large number of categorical features and large number of values per feature may make machine learning challenging.

The following are examples of techniques for addressing such challenges. As one example, there may be many dependencies between features. For example, one feature may depend on another feature. It may be challenging for machine learning to handle features that are not independent of each other. In some embodiments, rather than attempting to use more advanced and difficult models to try to counteract these features, the features are combined based on knowledge of feature interdependency in the OTT space. For example, rather than using publisher, asset, and device as individual features by themselves, publisher, asset, and device are used as a single combined feature. Various subsets of features may be combined. The subsets of features that have the largest impact on quality can be determined. Thus, the number of features used in the machine learning can be pruned by determining the impact of different subsets of features.

For example, a model can be run with a large number of features on a small subset of the received session/broadband data to see if any of the combinations of features have negligible effects on the quality metric. Those combinations with very little impact are then pruned out. This results in both faster and more accurate machine learning processing.

This is because the machine learning problem can become more unconditioned with a large number of features.

The features are created in a manner that separates the influence of different items that should be discerned during the predictive fault isolation process (e.g., IP addresses, fiber nodes, assets, etc.). The features are also created in a manner that allows replacement of feature values when using the already trained model. Further details regarding replacement and prediction are described below.

The predictive model is generated to use the aggregate features to predict a metric that is a measure of quality for a video session. In this example, suppose that the predictive model is being generated to predict the label, rebuffering ratio (i.e., to predict the label rebuffering ratio of the various features (both categorical and continuous/discrete) described above). Prediction of other labels (e.g., other) metrics may also be performed.

The created predictive model is trained, using model training engine 114, on the historical data (e.g., session summary data joined with network topology data) received by system 106. The model is trained on data of a period of prediction/interest, as well as one or more previous periods. For example, the model is trained on the data of the week of interest and on one or more previous weeks. The training on the previous periods is used to provide a larger data set for the model training. In this example, the actual RBR of observed sessions is used to generate the predictive, non-linear model/function.

As one example, the model is trained on two weeks of session data, and then predicted for the the second or latter week of the session data. This results, over time, in sliding two week periods that overlap for one week. While the model is used to predict rebuffering ratio (the percentage of the time a user spends in buffering, after the video starts), ultimately the prediction will be used to isolate faults, as will be described in further detail below. The model will be used to predict the rebuffering ratio and then determine what is causing the ratio to change or be different.

The predictive model that is generated is a non-linear function of the features (e.g., performs predictions of RBR with respect to categorical feature values). Using the model, rebuffering ratios may be predicted for any set of input feature values, regardless of whether there were actual historical sessions that had values matching the set of input feature values. For example, the model can be provided an arbitrary set of categorical feature values (where the combination of categorical feature values provided as input to the model is not required to match to a session that actually existed), and a predicted RBR is provided as output by the model.

After training the predictive model, the model is used to make counterfactual predictions, such as a prediction of what the predicted quality outcome for a copy of a session would be if a different service group or fiber node had been used.

Fault isolation engine 116 is configured to isolate faults using the generated predictive model. As will be described below, faults are isolated using a counterfactual approach. In this example, session quality prediction engine 118 is configured to use the generated predictive model to obtain a prediction (of the quality) for each session in the period (e.g., week) of interest. This prediction is referred to herein as the "real" prediction (since it is based on the data values of real sessions).

In this example, the model is created on data of a first period, while the predicting is performed on another period. For example, a subset of the session data (e.g., the second week of the two week period) is used to generate a first "real" RBR prediction based on the actual categorical values of actual observed sessions. In some cases, the training of two weeks and prediction based on one week of session data is so that training data is not reused in its entirety. Heuristics may also be used to determine the training period and the prediction period. The first prediction, using the categorical features of actual sessions, can also be used to validate the model, and to check or determine its accuracy. The accuracy achieved (e.g., prediction for each session) may be measured using various metrics, such as mean absolute error, root mean square deviation, $R^2$, etc. If the prediction of the RBR for those actual sessions differs too much (e.g., beyond some threshold) from the actual observed RBR for those sessions, then the predictive model may be tuned. For example, some of the combinations of the (embedded) categorical features may be pruned, as described above. Other parameters, such as the coefficient of adaptation, or the forgetting factor, in gradient boosted trees may also be modified.

The prediction of the RBR values for observed categorical feature values of actual observed sessions will be used in the counterfactual approach, as this will ensure that it is the predictive model that is indicating what feature is faulty (where the model is validated based on its accuracy).

Suppose in this example that it is to be determined whether a particular fiber node, fiber node number 10, is faulty. Fiber node 10 may be represented as a feature in various ways, such as one-hot encoding or embedding, which may depend on the type of machine learning approach being used (further details of which will be described below). Suppose that there are 500 sessions under fiber node 10 for the current week. The feature values for those 500 sessions for the current week (versus the two weeks used during training) are provided as input to the predictive model. Suppose in this example, that the average predicted RBR for those 500 sessions under fiber node 10 is 3.8%.

After obtaining the predicted RBR values for actual sessions for the second week of session data, the second week of data is modified, and re-prediction of RBR is performed on the modified data of the second period of time.

For example, feature replacement and re-prediction engine 120 is configured to use the generated predictive model to obtain predictions of the quality of each session of the period of interest, as described above, but with values of certain features being replaced by suitably chosen ideal or "good" values. In some embodiments, the replacement and prediction is done separately for each feature of interest or category (e.g., IP addresses, fiber nodes, etc.). The "good" values replacing the "real" values are selected to imitate how the item (e.g., fiber node) would appear if it were a good node. This re-prediction is referred to herein as the "replacement" prediction.

In some embodiments, the determination of a "good" feature value is made by first establishing a "good" line. For example, for each feature of interest (e.g., fiber node, IP address, device types, services groups, etc.), a good value for that feature is determined—i.e., if that feature had that "good" value, and assuming all else was fine, then the rebuffering ratio would be ok (put another way, the rebuffering ratio would not be affected by that feature if the feature had that "good" value). As one example, a fiber node whose average value of its rebuffering ratio over all sessions is above the "good" line or threshold is determined to be a good fiber node For example, for each of the 500 sessions that were observed to have received data via fiber node 10, the fiber node for those 500 sessions are replaced with fiber node 20, which is known to be "good," with all other categorical feature values being kept the same for the sessions. This replacement is done for all sessions with fiber node 10. All other values are left the same for every single session that belonged to fiber node 10. This has an analogous physical representation of replacing, for the sessions, one fiber node with another fiber node. This allows a determination or measurement of what the experience of a user would have been if their session were actually on a different fiber node.

A replacement prediction is then performed by inputting the modified session categorical feature values into the predictive model. For example, the 500 sessions, with the replaced fiber node value of fiber node 20 instead of fiber node 10, are provided as input to the predictive model. The predictive model then outputs the new, re-predicted rebuffering ratio for the sessions with replaced fiber node values. Suppose, for example, the re-predicted average rebuffering ratio with a "good" fiber node swapped in is now 1.5% for the 500 modified sessions.

The impact, on the predicted quality of the video sessions, of replacing feature values is determined using feature impact determination engine 122. The impact is measured as the change in predicted rebuffering ratio when replacing a specific feature value with a known "good" feature value (e.g., change in predicted buffering ratios for the 500 sessions when replacing fiber node 10 with fiber node 20). As one example, the difference between the "replacement" prediction and the "real" prediction, aggregated over all sessions of an item or feature (e.g., over all sessions belonging to a certain IP address) and averaged, is used to generate a score for the item, where the score reflects an effect or impact that the feature has on the quality of the video sessions.

In the example of FIG. 1, the initial predicted average RBR was 3.8% for the 500 sessions under fiber node 10. The re-predicted average RBR with the replaced feature value of fiber node 20 is 1.5%. The difference between the initial prediction and the re-prediction or replacement prediction (2.3% in this example) is referred to as the "impact" of the fiber node 10 on session RBR. The replacement prediction indicates that, with all other features staying the same—and only replacing the fiber node—the rebuffering ratio for the 500 sessions is predicted to improve by 2.3% (dropping from 3.8% to 1.5%).

Thus, this counterfactual approach of performing an initial prediction and then comparing the difference to a re-prediction based on replacement of a feature or component of interest may be used to measure the effect of an ecosystem component on sessions.

If the impact of replacing the fiber node (across all sessions belonging to that fiber node feature) with a known "good" fiber node exceeds a threshold, then in some embodiments, it is determined that the fiber node that was replaced (fiber node 10 in this example) was faulty. Thus, a fault in the ecosystem component has thus been isolated. If there is no difference to the predicted RBR when replacing the fiber node, then it can be determined that the fiber node is good.

In some embodiments, an impact threshold may be established such that if the impact of the feature value on the label (rebuffering ratio in this example) exceeds the threshold, then the feature value is determined to be faulty. If there is no difference to the predicted label when replacing the feature (or the difference is below the threshold), then it can be determined that the feature value is good or not faulty. For example, suppose that the impact threshold is set at 1%. Because fiber node 10 had a 2.3% impact on rebuffering, greater than the impact threshold, then fiber node 10 is determined to be faulty. In another embodiment, those items with the worst effect (e.g., score based on impact or difference in switching feature values) are selected as the source of the fault.

Thus, the fault has been isolated by determining which features have the greatest impact on predicted video session quality, where the impact of a feature is determined by performing multiple predictions, where values of the feature are changed between the predictions, and the differences or deltas in the predicted video session quality are indicative of the impact of the feature value on video session quality.

In this example, the counterfactual prediction procedure (determining the difference between initial prediction and replacement prediction) is performed for every single fiber node to determine their impacts. The fiber nodes may then be ranked according to impact. As described above, a threshold may also be established, where any fiber node that has an impact greater than, for example, 1% (impact of switching to a "good" fiber node) is determined to be a bad fiber node.

In some embodiments, the replacement and prediction is done separately for each categorical feature (e.g., IP addresses, fiber nodes, etc.).

Figure 2:
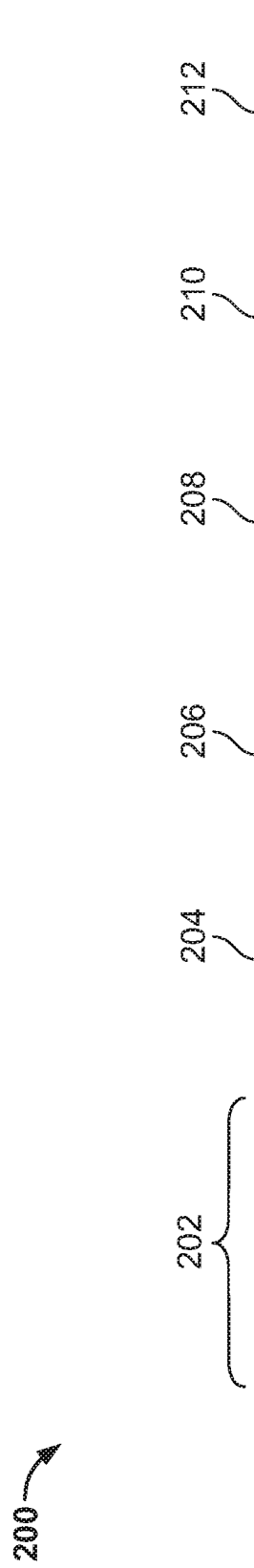
FIG. 2 illustrates an embodiment of measuring the effect of an ecosystem component on a session.

FIG. 2 illustrates an embodiment of measuring the effect of an ecosystem component on a session. The results of applying the counterfactual prediction process described herein to two sessions are shown. The effects of ecosystem components (fiber node and PCD) on the rebuffering ratio of the two sessions are shown. Each row of table 200 corresponds to a session.

At 202 are shown the network components (fiber nodes and PCD) that were actually observed for each session (e.g., after performing the joining of network topology information to session information, as described above). In this example, the feature, PCD, is a grouping of three individual features—publisher, CDN (and geo (CRAN)), and device. The selection of groupings of features in the modeling will be described in further detail below.

At 204, the RBR is predicted (e.g., using the predictive model built, as described above) for the sessions given the actual observed network components.

At 206 is shown the re-prediction of the RBR for the session with the fiber nodes of the session replaced with a "good" fiber node, as described above. Shown at 208 is the impact on the predicted RBR from switching from the observed fiber node to the good fiber node. In this example, the impact of switching the fiber nodes on RBR is measured as a difference between the predicted RBR of 204 and the re-predicted RBR of 206 with the replaced fiber node.

At 210 and 212 are shown a re-prediction of the RBR by replacing the observed PCD of the session with a "good" PCD, and the impact on predicted RBR from switching to the good PCD, respectively. For each session, the impact of each category or feature used in the predictive model is individually determined using the feature value replacement and re-prediction techniques described herein.

The aggregate impact of a feature value may be determined as the average of the determined impact aggregated across all of the sessions belonging to the feature value that was replaced.

The impacts of each feature in the model may also be used to provide various types of output, as will be described in further detail below.

While an example of fiber nodes was described for illustrative purposes, the counterfactual approach described herein may be applied to other features, such as service group, IP address, device type, etc.

Output engine 124 is configured to provide output based on the results of the fault isolation. As one example, a list of faulty factors is provided as output (e.g., based on the impact of the factor exceeding a fault threshold as described above).

In some embodiments, an output is provided that is a list of the top faulty factors including fiber nodes, IP addresses, publishers, CDNs, devices, service groups, DSLAMs, etc. For example, a rank order-based system is provided, where every single fiber node is evaluated for their impact. The fiber nodes are then evaluated by impact. The ranking and the threshold may be used to determine faulty fiber nodes. Alerts may also be sent notifying the ISP of detected faulty or problematic network components.

As another example, QoE scores for the aforementioned factors may be outputted. For example, the categories with the worst scores are provided as output. For example, the service groups or fiber networks identified or classified as problematic are outputted as a file (e.g., CSV file) to ISP 104. ISP 104 may then use the file to tune/fix their broadband network.

As yet another example, a graphical representation, such as a pie chart may be presented of the attribution of all faults to the aforementioned factors. As another example output, a session level summary may be provided for all top faulty factors including all available features, metrics, and metadata.

In some embodiments, the experience data captured from device end-points, along with viewer behavior, are leveraged to provide, for example, a feed to power marketing and customer care systems, through which actions can be taken to touch users to reduce the probability of abandonment. Automated near real-time feeds or manual feeds may also be made available.

Figure 3:
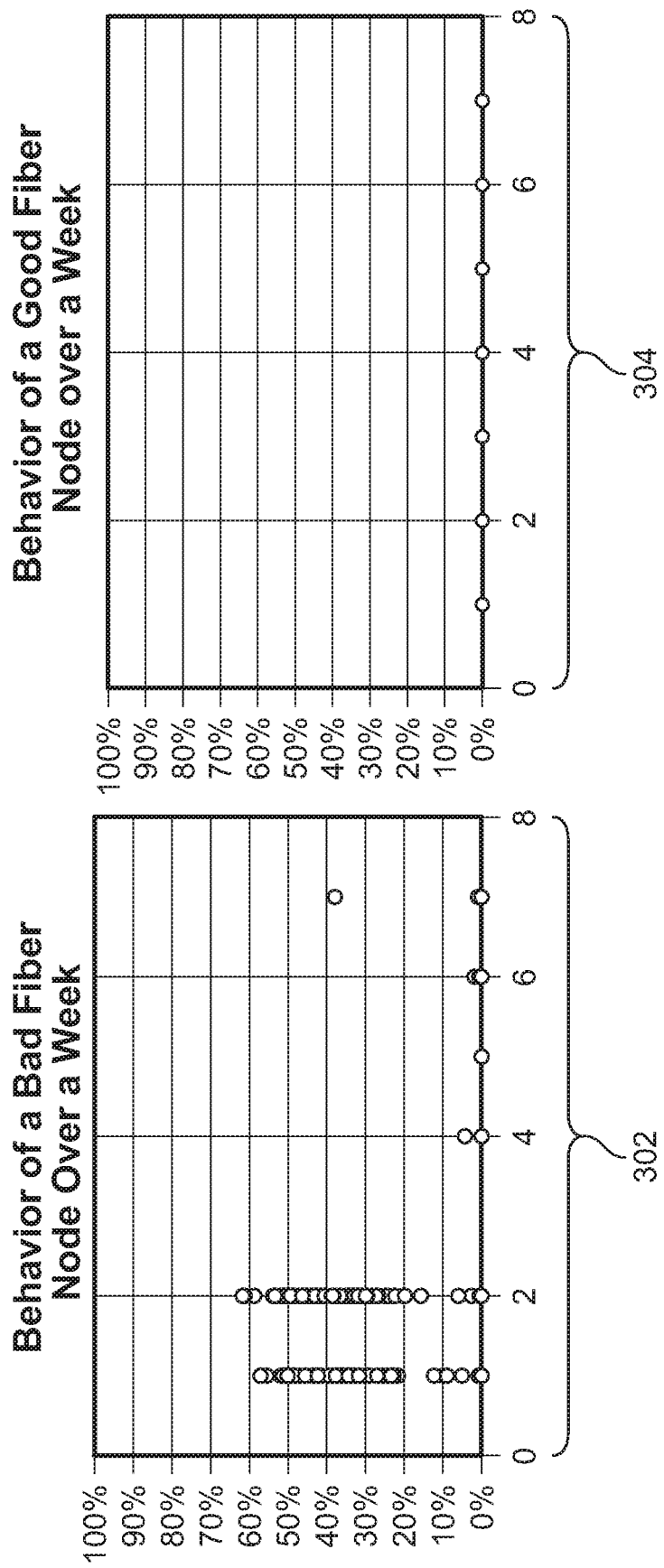
FIG. 3 illustrates an embodiment of a comparison of Good and Bad Fiber Nodes by QoE.

FIG. 3 illustrates an embodiment of a comparison of Good and Bad Fiber Nodes by QoE. Shown at 302 is a fiber node which has poor behavior over a week (e.g., the RBR of sessions falling under this fiber node have high rebuffering, in particular, at the beginning of the week). Shown at 304 is a fiber node which has good behavior over a week (e.g., the RBR of sessions falling under this fiber node have very low rebuffering). Using the techniques described herein, a problematic fiber node may be classified by user QoE.

Figure 4:
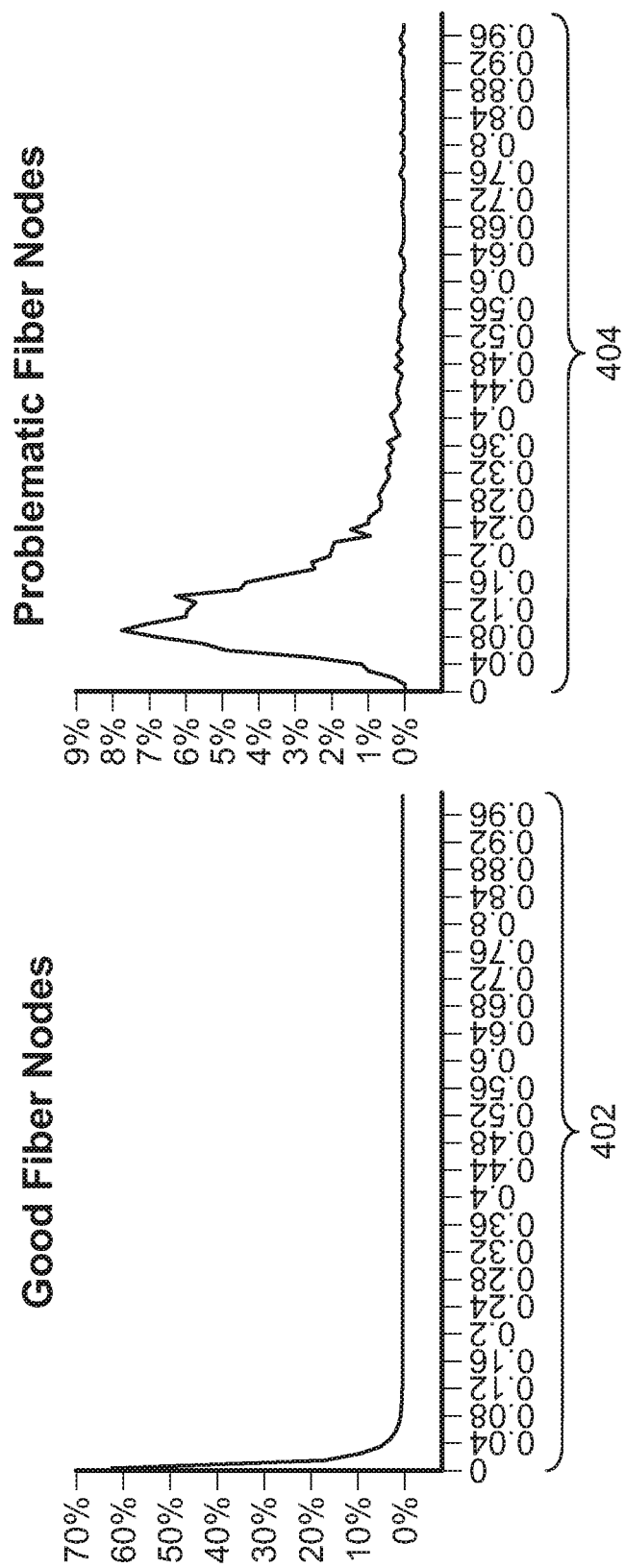
FIG. 4 illustrates an embodiment of a classification of fiber nodes validated by customer QoE.

FIG. 4 illustrates an embodiment of a classification of fiber nodes validated by customer QoE. As described throughout, using the techniques described herein, problematic fiber nodes may be identified or classified using a predictive model. As shown in this figure, the classification of fiber nodes as problematic based on prediction may be validated by returning to the actual observed/collected session data, and visualizing at 402 the amount of rebuffering experienced by sessions falling under fiber nodes predicted or classified to be problematic, and also visualizing at 404 the amount of rebuffering experienced by sessions falling under fiber nodes classified or predicted to be good (or non-problematic). As shown in the example of FIG. 4, the classification using the counterfactual approach is validated because good fiber nodes have a clear pattern of lower rebuffering, as shown at 402.

In the above example, fault isolation of fiber nodes was performed. Fault isolation using the counterfactual predictive procedure described above may be performed on every other feature, such as IP addresses, service groups, device types, etc. to measure the effects of ecosystem components on video sessions and isolate faults with ecosystem components.

While examples involving a cable network service provider were described above, the fault isolation techniques described herein may be variously adapted to accommodate other types of broadband networks (e.g., wireless broadband, DSL, fiber, etc.) as applicable. For example, in the Cable network example described above, CMTS, service group, fiber node, IP, publisher, CDN, Geo, and Device were considered as features in the predictive model. For DSL, features of interest may include edge routers, BRAS (Broadband Remote Access Server), DSLAM, IP, Publisher, CDN, GEO, and Device. For mobile networks, features of interest may include PGW (Packet gateway), RNC, Cell, IP, Publisher, CDN, GEO, and Device.

Further, in the above examples, RBR was used as an example of a QoE metric used as a label on which to base prediction. Other QoE metrics may be used for the prediction, such as video start time, average bitrate, video start failures, number of buffering events, video MOS (Mean Opinion Score), etc. Video MOS, hereby referred to as vMOS, is an aggregate score derived from several QOE metrics. vMOS is expressed as a single real number on a scale from 1 to 5. vMOS represents the mean opinion score of the perceived quality, where 1 is the lowest perceived quality, and 5 is the highest perceived quality.

System 106 is illustrated as a single logical device in FIG. 1, and can comprise standard commercially available server hardware (e.g., having a multi-core processor, 16+ Gigabytes of RAM, a set of one or more Gigabit network interface adaptors, and a set of one or more storage devices) running a typical server-class operating system (e.g., Linux). In various embodiments, system 106 is a scalable, elastic architecture comprising distributed components, including components provided by one or more third parties (e.g., provided by Amazon Web Services). Further, when system 106 is referred to as performing a task, such as storing data or processing data, it is to be understood that a sub-component or multiple sub-components of system 106 (whether individually or in cooperation with third party components) may cooperate to perform that task. In one example embodiment, system 106 is implemented using Apache Spark and Scala.

Random Forest and Boosted Trees

Various types of machine learning approaches may be used for the predictive model that is generated. Two examples of machine learning approaches that accept both continuous and discrete features include random forest and boosted trees.

Random Forest

The random forest is good for dense data and large numbers of features. Typically, multiple trees are generated from bootstrapped data. The generated trees are then averaged. The random forest approach produces independent and identically distributed (iid) (or more independent) trees by randomly selecting a subset of predictors at each step. For example, the random forest may use hundreds of deep, big trees, where variance reduction is achieved through averaging. The trees are used in parallel, with the results of all trees averaged.

The categorical features may be put or fed into the random forest using one-hot encoding. One-hot encoding provides a type of indicator feature. For example, suppose that there are two thousand names or labels or values for the fiber node categorical feature. The categorical feature is converted into two thousand one-hot encoded features. The two thousand one-hot encoded features will be such that each feature will have a value of 1 or 0. If a session belongs, for example, to the $7^{th}$ fiber node, then the fiber node feature will have a value of 1 for the seventh one-hot encoded value, and zero for the remaining. Thus, a categorical feature of fiber node with two thousand values, when one-hot encoded, results in two thousand new features for the fiber node.

This approach may be used when the number of different values a feature may take does not exceed a point at which the random forest cannot train properly. For example, suppose that the fiber node categorical feature, at the city level, has several thousand values (e.g., for the city of San Jose, Calif., there are a few thousand fiber nodes). For this number of feature values, the random forest may still train properly, and allow for the counterfactual approach at the city level. However, at the country level (e.g., United States), there may be hundreds of thousands of fiber nodes, in which case, the random forest model may not train properly. For example, if there are two hundred thousand fiber nodes in the US, then one-hot encoding of the feature will result in two hundred thousand new features being created, which may result in the random forest being unable to train properly. As another example, consider the categorical feature of Internet Protocol (IP) addresses. If there are five million IP addresses, then one-hot encoding will result in five million features. Similarly, for service groups, if there are 50,000 service groups, one-hot encoding will result in 50,000 features. One-hot encoding of such features will result in the generation of a large number of new features which may overwhelm the random forest machine learning model/approach.

Boosted Trees

To accommodate large numbers of feature values (e.g., to perform fault isolation on a national scale), other approaches, such as boosted trees (residual, gradient descent) which provide a more simplified model (as compared to the full model of the random forest), may be used.

Boosted trees are excellent with a small number of well-designed features. Trees are grown sequentially, where a decision tree is fit to the residuals from the model. This new decision tree is added to a fitted function in order to update the residuals. As one example, boosted decision trees use a large number (e.g., thousands) of shallow, small trees (in contrast to the lower number of deep and large trees of random forest), with bias and variance reduction achieved through boosting.

The following is an example process for using boosted trees for regression:
1. Set $\hat{f}(x)=0$ and $r_i=y_i$ for all i in the training set.
2. For b=1, 2, . . . , B, repeat:
   a. Fit a tree with d splits (+1 terminal nodes) to the training data (X, r).
   b. Update the tree by adding in a shrunken version (negative gradient descent) of the new tree:

$$\hat{f}(x) \leftarrow \hat{f}(x) + \lambda \hat{f}^b(x)$$

c. Update the residuals $$r_i \leftarrow r_i - \lambda \hat{f}^b(x_i)$$

3. Output the boosted model, $$\hat{f}(x) = \Sigma_{b=1}^{b} \lambda \hat{f}^b(x)$$

In the above, each new tree is trained with residuals (in a sequential manner), where the final boosted model is a weighted average of all trees.

The well-designed features may be generated or designed by the embedding (generating representations) of categorical features. Boosted trees are one example of machine learning approaches that perform well with embedded features (e.g., perform better in terms of quicker convergence). Embeddings of all categorical features may be created. As one example, embedding of a categorical feature includes converting the categorical feature, which may have many discrete values, into a continuous value. As one example, consider the fiber node categorical feature, which, in this example, at the national level, has 200,000 fiber node values. The fiber node categorical feature is embedded and converted into a continuous single value as follows. For each fiber node (value), the average rebuffering ratio of that fiber node, over all sessions observed in a time period (e.g., two week training period), is determined. The average rebuffering ratio of the fiber node is an embedded way of representing that fiber node. For example, suppose that in the example of FIG. 1, for fiber node 10, it is determined that the average rebuffering ratio for all the sessions that belong to fiber node 10 is 1.3%. Fiber node number 10 is then represented by the embedded value 1.3%. Referring again to the example of FIG. 1, suppose that fiber node 20, when embedded based on the average session rebuffering ratio, has a known good rebuffering ratio of 0.2%. In some embodiments, the determination of a "good" fiber node is based on a low actual rebuffering ratio embedded value (i.e., based on actual measured RBR from actual session data) and/or a low predictive value.

When the replacement prediction is made, the value for the fiber node of the 500 sessions is switched from the 1.3% embedded value for fiber node 10 to the 0.2% embedded value for fiber node 20.

Other features may already be provided as continuous features (and need not be embedded), such as time of day. Other features, such as connection type, which may only have a small number of values, also may not need to be embedded. For example, if there are only three connection types (e.g., wireless, Wi-Fi, or Ethernet), then the connection type feature need not be embedded (because it can be represented, for example, by just three values, such as 0, 1, or 2). In comparison to one-hot encoding, by performing embedding, the number of features used in the machine learning is reduced. For example, rather than resulting in the creation of more features, as in one-hot encoding, embedding allows features such as fiber node, IP address, and service group to be embedded and represented as single continuous values.

Grouping of Features

As described above, some features may also be grouped into a single feature. As one example, a publisher, CDN, and device may be combined into a single feature referred to herein as "PCD." Groupings that have the largest influence or impact on the quality of sessions may be used as features. For example, while each of publisher, content, and device may not individually have much influence on RBR, it may be determined (e.g., by evaluating different combinations of individual features) which features together have a large or maximum amount of influence.

One example of determining groups is as follows. Different features and combinations of features are evaluated to determine the average influences of each of the features/combinations on the predicted quality for RBR (e.g., for a given week). Sessions that are problematic are identified. As one example, sessions that have greater than 2% RBR are identified. The contributions of each of the features/combinations on the identified problematic sessions are determined. For example, suppose that there are one hundred sessions that are identified as problematic, having RBR greater than 2%. Out of those one hundred sessions, the number or ratio or proportion or percentage (i.e., contribution) of the hundred sessions that were caused by each feature/combination of features (e.g., fiber nodes, bad service groups, bad PCDs, bad publishers, bad devices, bad CDNs, bad IP addresses, other groupings, etc.) is determined. Suppose that individual contributions of publisher, CDN, and device were small, but the combination of PCD contributed to a large portion of the bad sessions. The combined grouping of PCD may then be selected for modeling (rather than using the individual features for modeling).

Figure 5:
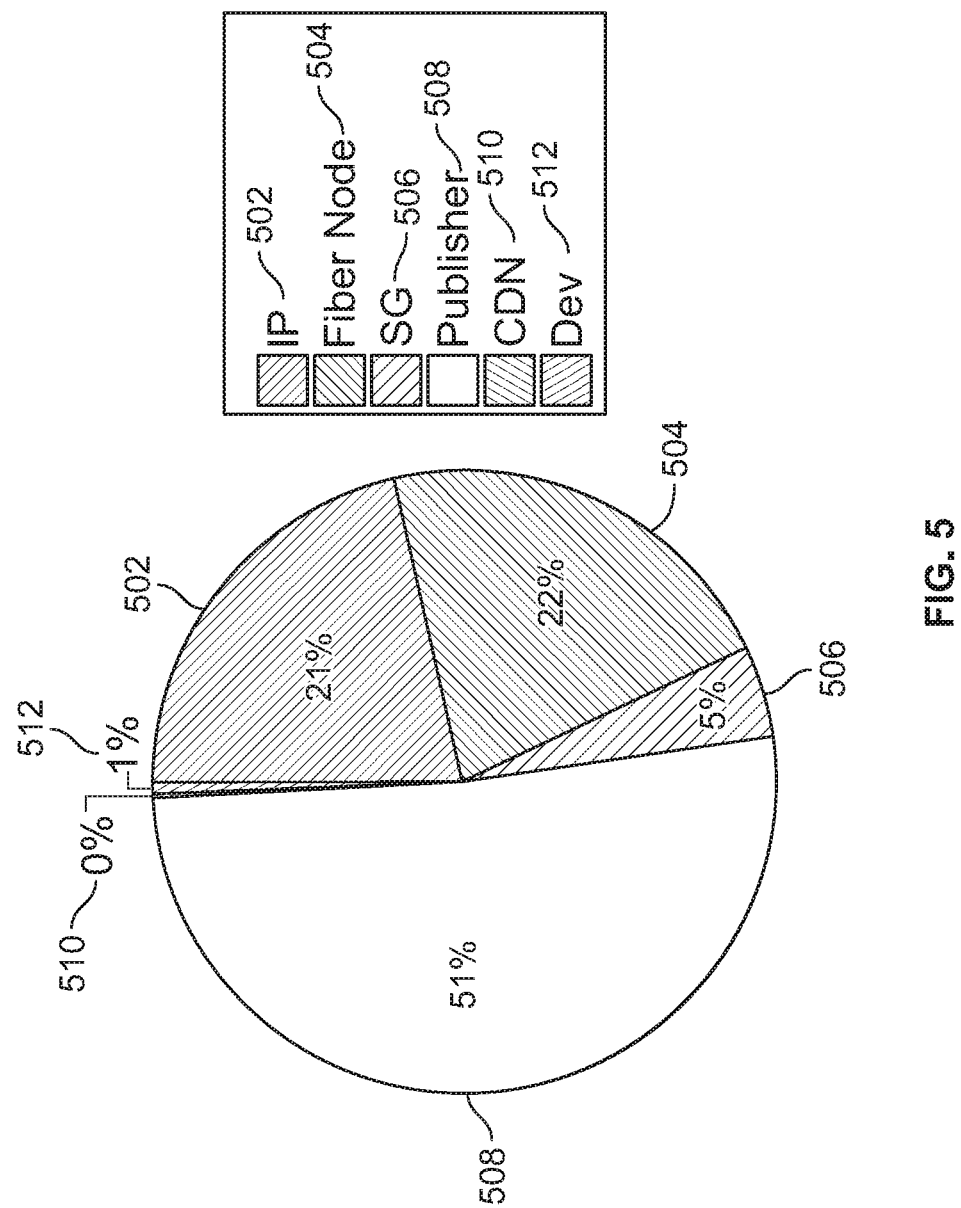
FIG. 5 illustrates an embodiment of a pie chart of impacts on customer QoE.

FIG. 5 illustrates an embodiment of a pie chart of impacts on customer QoE. The pie chart breaks down the impact of IP addresses (502), fiber nodes (504), service groups (506), and PCDs (publisher (508)/CDN (510)/device (512) combinations) on quality. Each slice represents the total amount of improvement that could be achieved by replacing ecosystem components with better ones. As shown in this example, PCD combinations have the highest impact. Fiber nodes have significant impact. Last mile end user IP address issues also have a significant impact as well. With respect to PCD, although the ISP does not have control over PCD, the information provided in the chart is still useful to the ISP, as the ISP can distinguish between problems caused by its own infrastructure and network components out of its control. The ISP can, for example, notify a publisher that there are issues caused by network components associated with the publisher.

Additional Details Regarding Model Structures

Simplified Model

Described above was a meta-model that is based on gradient boosted trees regression. The meta-model is referred to as a simplified model because categorical variables were represented (embedded) by several selected real valued features. Various approaches may be taken for the representations (embeddings) of the categories (e.g., IP addresses, fiber nodes, etc.).

Categorical Features

In some embodiments, each category is characterized by at least two features (real values in each session):

1. Average label across all sessions of the category value, with the value of this specific session excluded from averaging.

2. Total number of sessions of this category value.

Some of the items may have additional features in their embedding. For example:

1. N=Fiber node:
A. Number of IP addresses related to it (e.g., through the sessions in common)
2. S=Service group:
A. Number of IP addresses related to it.
B. Number of fiber nodes related to it.
3. P=Publisher:
A. Number of CDN & Geos related to it.
B. Number of CDNs related to it.
4. A=Asset & Publisher:
A. Average bitrate.
B. Average playtime.
5. C=CDN & Geolocation(CRAN):
A. Number of publishers related to it.
B. Number of service groups related to it.
6. D=Device:
A. Average bitrate.
7. AC=Asset & Publisher & CDN & Geo:
A. Average bitrate.
B. Average playtime.
8. AD=Asset & Publisher & Device:
A. Average bitrate.
B. Average playtime.
9. PCD=Publisher & CDN & Geo & Device:
A. Average bitrate.

10. ACD=Asset & Publisher & CDN & Geo & Device:
A. Average bitrate.
B. Average playtime.

Continuous and Discrete Features

Examples of continuous and discrete features that are not categorical features include:

1. Is live? This is live (1) or not (0).
2. Content length: Natural logarithm of (1+content length/8 sec).
3. Is it Saturday? The session is playing at Saturday (1) or not (0).
4. Is it Sunday?
5. Hour of the day.
6. Absolute time across the whole considered time interval (e.g., two weeks). Included as a guard against uniform changes—e.g., general big events or internet traffic troubles.

While in the simplified model, categorical values are embedded by several selected real valued features, there may be a loss of information for items spanning large geographical regions (e.g., the entire US), such as assets, devices, and publishers.

Full Model

The simplified model is in contrast to a full model, in which, for example, categorical variables are represented as one-hot encoded features (as described above with respect to the use of random forest-based machine learning), where additional real features are treated as is. The simplified model may allow the fault isolation to be performed on a larger geography as compared to a full model (e.g., country level versus city level). For example, the full model may be used for a limited area (e.g., city), while a simplified model may be used when performing fault isolation over an entire country.

Deep Learning and Neural Networks

Another example of a model structure that may be used is neural networks. When using neural networks, different types of embedding may be used, as well as different types of networks. One example is a deep network, which is a neural network that has various intermediate layers. A wide network may also be used, where a wide import area is considered, but the number of layers is smaller (in comparison to the deep network—an analogy would be that a random forest is to boosted trees as a wide network is to a deep network).

Neural networks may be used instead of trees because they offer the following advantages: Embedding can be trainable, Natural processing of sequential data, such as daily features, Better ability to adjust to modified data, rather than retrain from scratch.

For example, while the random forest or boosted trees may be effective on a time scale of weeks (e.g., for the ISP to obtain a list of problematic network components on a weekly basis), suppose that the ISP would like the fault isolation to be performed on a higher frequency basis, such as every day, or every hour. Neural networks provide the flexibility to allow sequential processing. Further, the neural network may operate at a lower granularity with more features.

For example, neural networks can be incrementally updated, on a daily basis. This allows for the prediction to be updated when network components are updated (e.g., new modems, new Wi-Fi access points, fiber node fixes due to truck rolls, new IP addresses (which may be updated quickly, for example hourly), etc.). Thus, the features may also be observed at a more granular level (e.g., on a time driven basis), rather than being treated as fixed when using the predictive model.

As one example, a neural network model may be created using the TensorFlow framework. In one embodiments, the neural network model with trainable embedding is an embedding-deep model. Each category is represented by trainable embedding as a first layer of a deep learning neural network. In an embedding-deep-and-wide model, each category (or combination of categories) may also be represented fully or bucketed for an additional simple "wide" part of a model. In a wide model (e.g., full model), each category is fully represented as a one-hot encoded feature. When using the neural network approach, dimensionality of embedding should be selected reasonably for each category. One approach would be to select the dimensionality as proportional to log of category size. The "reference" nodes (relative to which the influence on the session is estimated) may be iteratively identified to find the "best" nodes. As another approach, a random set of nodes may be used. Datasets that are used for training may be created using one or more CRAN (geolocation) areas, or created and used for all areas at once. In some embodiments, the separate processing for each geo-location is performed for the embedding-deep-and-wide model and the full model. This is due to large datasets and long processing. A tradeoff to this would be a potential loss of information for items reaching across a large geographical region (e.g., US), such as assets, devices, and publishers.

Figure 6:
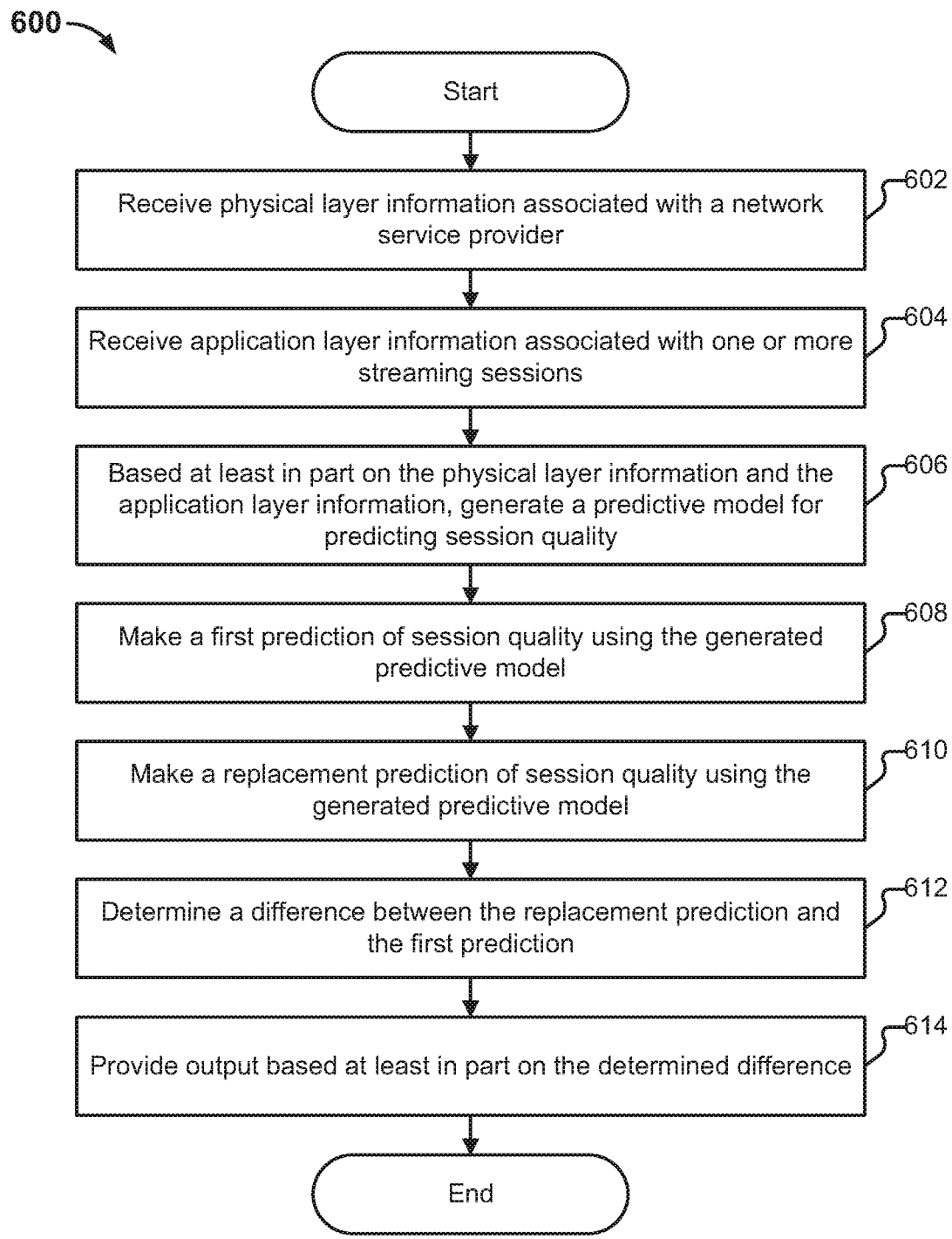
FIG. 6 is a flow diagram illustrating an embodiment of a process for fault isolation.

FIG. 6 is a flow diagram illustrating an embodiment of a process for fault isolation. In some embodiments, process 600 is executed by fault isolation system 106 of FIG. 1. The process begins at 602, when physical layer information associated with a network service provider is received.

Examples of physical layer information received include information received from an ISP whose infrastructure is used to deliver content to end-points in a video delivery ecosystem. The physical layer information received from the ISP includes network topology information for the ISP. The network topology information may be received as data corresponding to a certain time period (e.g., hierarchy of ISP IP addresses, fiber nodes, service groups, and geolocations (CRAN areas) for each week).

At 604, application layer information is received from clients. The application layer information includes session summary data associated with video sessions initiated by client devices that include content players for playing content. The session summary data includes session QoE metrics, as well as metadata such as CDN, publisher, IP address, device type, content type, etc.

The network topology information is joined with the session summary data based on information such as IP addresses obtained for video sessions initiated on client content players.

At 606, a predictive model for predicting the quality of sessions is generated. The predictive model is generated by using the (joined) physical and application layer information as features. Examples of factors in the physical/application layer information used as features include those factors that influence video quality. The predictive model is used to predict a label as a function of input feature values. The label may be a QoE metric such as rebuffering ratio, video failures, etc.

As part of building the model, the model is trained. The data used for training the model may cover a period or range of time that is different from the period of time of data used for performing prediction/re-prediction. For example, the model may be trained on the data of the current week and the previous week, while predictions during testing are performed using session data for just the current week. Other time periods may be used for the training/predicting phases.

At 608, a first prediction of session quality is made using the generated predictive model. For example, for a given feature value being evaluated, all observed sessions whose joined physical/application layer information includes the given feature value are identified. The sessions may belong to a certain period of time (which may differ from the training period). For example, a prediction of quality of each session for the current week is performed. The information for each of the identified sessions is used as input to the predictive model to predict the quality of those sessions. The prediction performed at 608 is referred to as the "real" or "initial" or "original" prediction.

At 610, a replacement prediction of session quality is made using the generated predictive model. For example, predictions of the quality for each session with the specific value of a feature (e.g., actual value of a feature that was used in the session that was observed) replaced by a "good" value are performed. For example, the actual fiber node (or its representation/embedding) used in an observed session is replaced by a representation or embedding of a "good" fiber node. The prediction performed at 610 is referred to as the "good" prediction or "replacement" prediction. In some embodiments, the "good" values replacing the "real" (actual) values are selected in imitation of how the item (e.g., fiber node) would behave if it were a "good" node or component.

In some embodiments, the replacement and the prediction described at 608 and 610 are done separately for each category (e.g., IP addresses, fiber nodes, etc.) using the model generated at 606.

At 612, a difference between the replacement prediction and the first prediction is determined. The difference between the "replacement" or "good" prediction determined at 610 and the initial or real prediction determined at 608, aggregated over all sessions with that feature value that was replaced, may be used as a score that reflects an effect that the item has on the video quality of video sessions.

In some embodiments, a fault in the content delivery ecosystem is isolated based on the impact score determined at 612. For example, items with a score exceeding a threshold are determined as faulty. As described above, in some embodiments, the prediction and replacement predictions described above are determined separately for each categorical feature, such as IPs, fiber nodes, etc. in the case of a cable ISP.

At 614, output based on the difference between the replacement prediction and the first prediction is provided (e.g., by output engine 124 of fault isolation system 106). For example, those features or items (e.g., FN, SG, IP, PCD, etc.) with the worst effect (as measured by the score determined at 612) are provided as output (e.g., to the ISP). For example, the top N (e.g., 500) worst fiber nodes may be outputted to a user (e.g., user-operator of an ISP utilizing the services of fault isolation system 106). Other problematic components, such as IP addresses, service routes, etc. may also be provided as output.

As another example of output, the system may provide alerts. For example, the ISP may be notified or alerted to possible issues in their network (e.g., problematic fiber nodes) so that they can take preemptive action. Other example types of outputs after diagnosing a fault include problematic service group reports, problematic fiber node reports, problematic IP reports, and problematic PCD (Publisher, CDN/GEO, Device) reports.

Each report provides a ranking of each feature value, the number of sessions belonging to the feature value, and the predicted RBR for the sessions belonging to that feature value.

Other examples of output are described above. The results of the counterfactual predictive process for fault isolation may be delivered that covers a period of time (e.g., each week).

In some embodiments, node health information, as measured by an ISP, is also received as part of the physical layer information at 602. This node health information may be compared with the results of the counterfactual predictive approach. The comparison of the ISP provided node health information and the results of the prediction may be outputted.

Thus, using the techniques described herein, faults in network components in a content distribution ecosystem are isolated based on the quality of the experience of end users streaming video. The quality of experience of video sessions is observed, as well as the portions of the video delivery ecosystem that were used to deliver the content in those video sessions. This information is used to infer which parts of the video delivery ecosystem are causing streaming problems in video quality.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    receive network topology information associated with a network service provider;
    receive session information associated with one or more streaming sessions;
    generate a predictive model for predicting session quality at least in part by using at least some of the network topology and session information as features;
    use the predictive model to determine a first prediction of session quality using a first set of feature values;
    generate a second set of feature values at least in part by replacing a first feature value in the first set of feature values with a replacement value;
    use the predictive model to determine a replacement prediction of session quality using the second set of feature values including the replacement value with which the first feature value was replaced;
    based at least on the first prediction and the replacement prediction, determine an impact of the first feature value on session quality; and
    isolate a fault in a content delivery ecosystem based at least in part on the determined impact of the first feature value on session quality; and
  a memory coupled to the processor and configured to provide the processor with instructions.

2. The system of claim 1 wherein the predictive model is used to predict a rebuffering ratio of a session given a set of feature values associated with the session.

3. The system of claim 1 wherein generating the predictive model further comprises training the predictive model.

4. The system of claim 3 wherein the predictive model is trained based at least in part on network topology information and session information associated with a first period of time, and wherein the first prediction and the replacement prediction are determined using a network topology information and session information associated with a second period of time that is shorter than the first period of time.

5. The system of claim 1 wherein the network topology information comprises information associated with a network component in the content delivery ecosystem, wherein the first feature value that is replaced comprises the network component, and wherein the processor is configured to isolate a fault with the network component.

6. The system of claim 1 wherein the processor is further configured to join the network topology information and the session information.

7. The system of claim 6 wherein the processor is configured to join the network topology information and the session information based at least in part on an internet protocol (IP) address.

8. The system of claim 1 wherein the network service provider comprises a cable network service provider, and wherein the network topology information comprises information associated with at least one of a Cable Modem Termination System (CMTS), a service group, a fiber node, and an IP address.

9. The system of claim 1 wherein the session information comprises Quality of Experience is (QoE) metrics comprising at least one of rebuffering ratio, video start time, average bitrate, a number of video start failures, a number of buffering events, and video mean opinion score (MOS).

10. A method, comprising:
  receiving network topology information associated with a network service provider;
  receiving session information associated with one or more streaming sessions;
  generating a predictive model for predicting session quality at least in part by using at least some of the network topology and session information as features;
  using the predictive model to determine a first prediction of session quality using a first set of feature values;
  generating a second set of feature values at least in part by replacing a first feature value in the first set of feature values with a replacement value;
  using the predictive model to determine a replacement prediction of session quality using the second set of feature values including the replacement value with which the first feature value was replaced;
  based at least on the first prediction and the replacement prediction, determining an impact of the first feature value on session quality; and
  isolating a fault in a content delivery ecosystem based at least in part on the determined impact of the first feature value on session quality.

11. The method of claim 10 wherein the predictive model is used to predict a rebuffering ratio of a session given a set of feature values associated with the session.

12. The method of claim 10 wherein generating the predictive model further comprises training the predictive model.

13. The method of claim 12 wherein the predictive model is trained based at least in part on to network topology information and session information associated with a first period of time, and wherein the first prediction and the replacement prediction are determined using a network topology information and session information associated with a second period of time that is shorter than the first period of time.

14. The method of claim 10 wherein the network topology information comprises information associated with a network component in the content delivery ecosystem, wherein the first feature value that is replaced comprises the network component, and further comprising isolating a fault with the network component.

15. The method of claim 10 further comprising joining the network topology information and the session information.

16. The method of claim 15 further comprising joining the network topology information and the session information based at least in part on an internet protocol (IP) address.

17. The method of claim 10 wherein the network service provider comprises a cable network service provider, and wherein the network topology information comprises information associated with at least one of a Cable Modem Termination System (CMTS), a service group, a fiber node, and an IP address.

18. The method of claim 10 wherein the session information comprises Quality of Experience (QoE) metrics comprising at least one of rebuffering ratio, video start time, average bitrate, a number of video start failures, a number of buffering events, and video mean opinion score (MOS).

19. A computer program product embodied in a non-transitory computer readable storage medium and comprising computer instructions for:
receiving network topology information associated with a network service provider;
receiving session information associated with one or more streaming sessions;
generating a predictive model for predicting session quality at least in part by using at least some of the network topology and session information as features;
using the predictive model to determine a first prediction of session quality using a first set of feature values;
generating a second set of feature values at least in part by replacing a first feature value in the first set of feature values with a replacement value;
using the predictive model to determine a replacement prediction of session quality using the second set of feature values including the replacement value with which the first feature value was replaced;
based at least on the first prediction and the replacement prediction, determining an impact of the first feature value on session quality; and
isolating a fault in a content delivery ecosystem based at least in part on the determined impact of the first feature value on session quality.

20. The computer program product of claim 19 wherein the predictive model is used to predict a rebuffering ratio of a session given a set of feature values associated with the session.

* * * * *